P. MUELLER AND A. C. SCHUERMANN.
NIPPLE EXPANDING MACHINE.
APPLICATION FILED NOV. 12, 1919.
1,415,043.
Patented May 9, 1922.
2 SHEETS—SHEET 2.
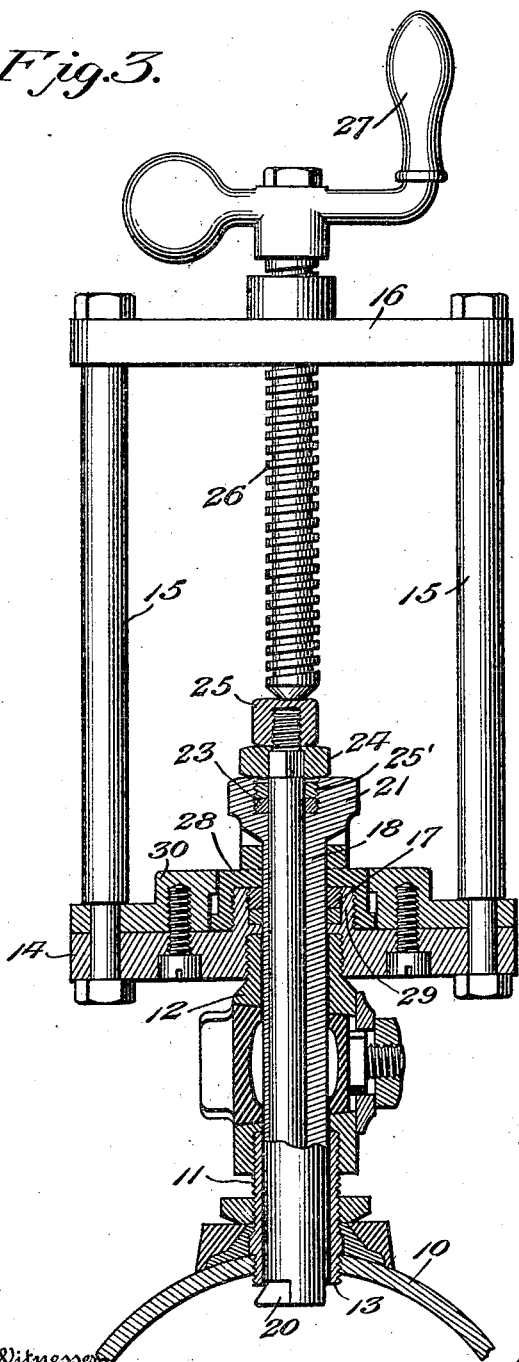
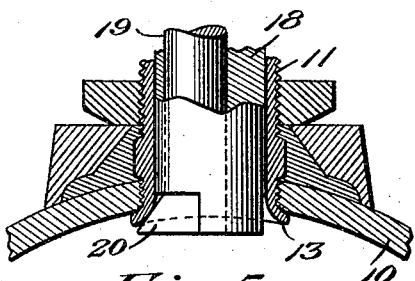
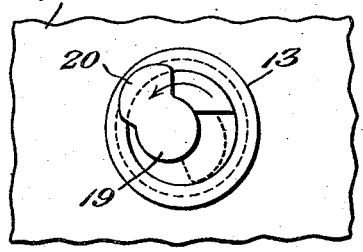
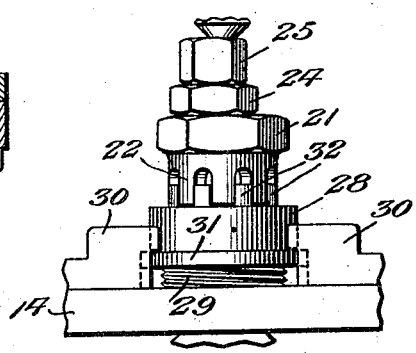
Inventors
Philip Mueller
Anton C. Schuermann
By Cushman
Attorney
Witnesses

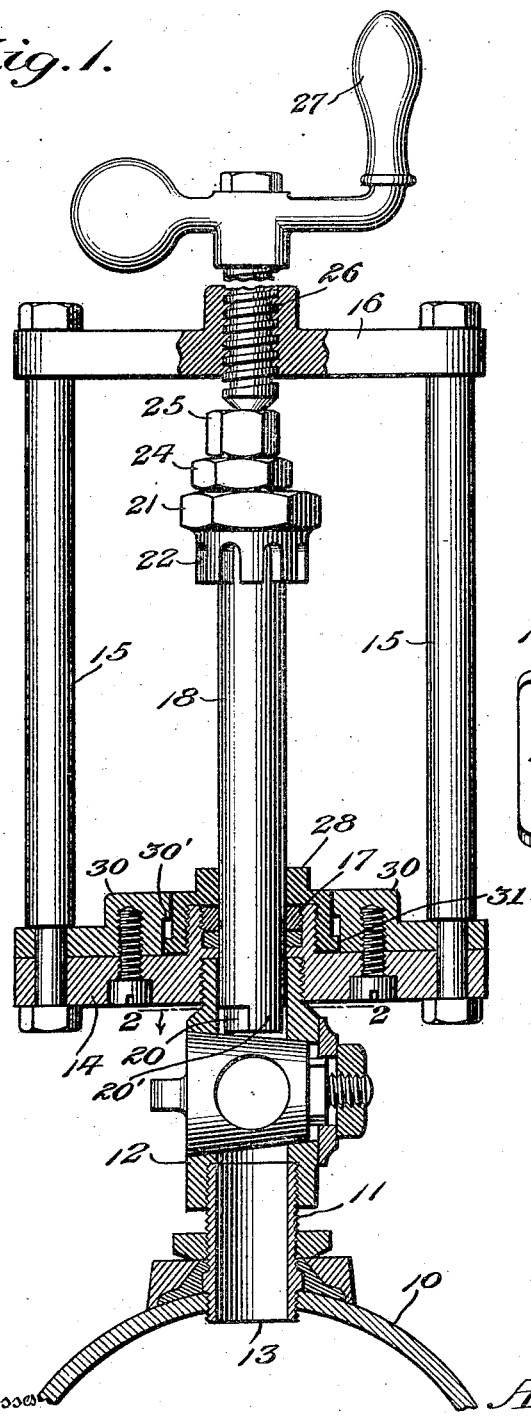
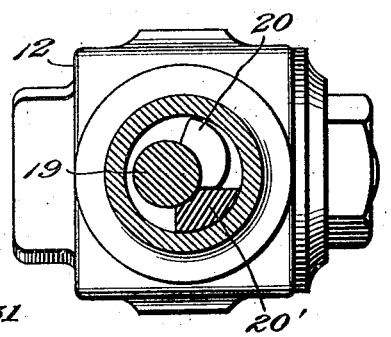
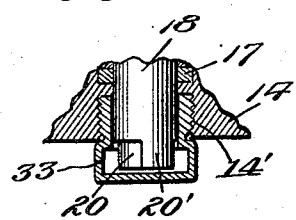

UNITED STATES PATENT OFFICE.

PHILIP MUELLER AND ANTON C. SCHUERMANN, OF DECATUR, ILLINOIS, ASSIGNORS TO ADOLPH MUELLER, TRUSTEE, OF DECATUR, ILLINOIS.

NIPPLE-EXPANDING MACHINE.

1,415,043.  Specification of Letters Patent.  Patented May 9, 1922.

Application filed November 12, 1919. Serial No. 337,491.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Nipple-Expanding Machines, of which the following is a specification.

The present invention relates to nipple expanding devices, for use in expanding nipples or pipe sections, which have been tapped or inserted into pipes or mains and which it is desirable shall be secured by being expanded within the pipe or main in which they have been tapped or inserted, in order that they may be locked firmly in position.

The expander which we have invented and which will be hereinafter described in detail, is of such construction that it may be successfully used in connection with mains or pipes, which are carrying fluid pressure. It is designed, further, to automatically secure the proper amount of expansion proportionate to the nipple extension which is being expanded. Furthermore, it is of such construction that it may be readily fitted to the work and the matter of expanding the nipple expeditiously performed.

In the drawings herewith, we have illustrated one embodiment of our invention, and in said drawings, Fig. 1, is a view, partly in section, of a portion of a main, with a nipple and a corporation cock secured thereto, and the expander in a retracted position, but ready to be brought to an operative position.

The Fig. 2, is a sectional view on line 2—2 looking in the direction of the arrow.

Fig. 3, is a view similar to Fig. 1, showing the device in its lowermost position ready for the expanding operation.

Fig. 4, is an enlarged sectional view, showing the device after the nipple has been expanded or spread.

Fig. 5, is a bottom plan view of the expander shown in Fig. 4.

Fig. 6, is a view in side elevation of the feeding device for controlling movement of the expander head.

Fig. 7, is a detail view showing the protecting cap for the expanding tool or head when not in use.

Referring to the drawings by numbers, like numbers indicating like parts in the several views, 10 designates a main or pipe which has been tapped in any suitable manner, as for example, by the tapping machine illustrated in Patent No. 1,280,813, granted to Mueller and Schuermann October 8, 1918, and which has had secured in the tapped orifice a nipple 11, with the corporation cock 12 secured thereto. It will be observed that the nipple 11 is securely mounted in the main 10, but that its lower end 13, has not been expanded to firmly lock it to the main, and it is obvious that this expansion of nipple must be from the interior.

In order to accomplish the proper expansion of the nipple we have provided an expanding device, which, as shown in Fig. 1, comprises a plate 14 having a threaded socket 14′ adapted to engage the threaded outer end of the corporation cock 12 which, as stated, is threaded to the nipple 11. The plate 14, is coupled by rods 15 to a second plate or cross-bar 16, which forms the abutment or resistance for the expanding tool during its operation.

Mounted centrally of the frame just described and passing through a suitable stuffing box 17 in the plate 14 is the expanding tool, which, as shown in Figs. 2, 3, and 4, comprises the carrier 18, in which is eccentrically mounted the rod 19, having at its lower end the expanding foot 20. The carrier 18 has at its upper end a nut or other formation 21 to receive a suitable wrench, and just below the nut or head 21 a series of lugs and notches or equivalent devices 22 are formed. The expander 19 traverses the carrier 18, eccentrically, passing through a stuffing box 23, at the upper end of the carrier and it, in turn, is provided with a nut or wrench receiving member 24, by which it may be turned and a lock nut 25, by means of which it may be locked in adjusted position, a packing nut 25′ being provided and having spanner nicks or slots to hold the packing of the stuffing box 23 in place.

With this construction of carrier and expander, it will be seen that the foot 20, may be swung to the position shown in full lines in Fig. 2 and dotted lines in Fig. 5, in which position it will lie within the circumferential area of the carrier 18, or it may be thrown to the position shown in Figs. 3, 4, and 5, so that it will extend outside of or lie eccentric to circumference of the carrier 18.

Mounted in the plate 16 of the frame is a feed and abutment screw 26, provided at its upper end with any suitable handle, as 27; the lower end of the screw bearing upon the nut 25 of the expander 19.

As thus far described the operation of the device will be as follows:

After the nipple and corporation cock have been mounted in the main, the nipple expanding device with the tool retracted as shown in Fig. 1 will be screwed to the corporation cock and if the main be under pressure, as is generally the case, the key of the corporation cock will be turned to the position shown in Fig. 1 to prevent escape of fluid from the main while the expanding device is being installed. After the device has been placed as shown in Fig. 1 the key of the cock will be turned, but owing to the fact that the carrier 18 and the expander 19 pass through the stuffing boxes 17 and 23, pressure from the main cannot escape. The feed screw 26 will then be run down forcing the tool to the position shown in Fig. 3, against any pressure which may be in the main, it being understood that the inclined expander foot 20, will be in the retracted dotted line position shown in Fig. 5, so that the expander 19 and carrier 18 will pass readily through the corporation cock and the nipple. When the tool has been brought to the position shown in Fig. 3, a wrench will be applied to the nut 24, and the foot 20 turned to the position shown in Fig. 3, so that it projects outwardly beneath the end of the nipple, and the lock nut 25 will then be turned to lock the parts in position. Thereupon a wrench or other suitable driving tool will be applied to the head 21, of the carrier 18, and said carrier, together with the expander 19 and its protruding foot 20, will be rotated, the projection 20' on carrier 18 driving the foot 20.

It is obvious that rotation of the inclined foot 20 against the lower end of the nipple 13 will spread or expand that lower end if an upward movement be given of the foot 20, and in order that this may be automatically and correctly done we have provided the feed member 28, comprising a cylindrical cup-like section which is threaded and engages a corresponding projection 29 on the plate 14. This feed member 28 is held between two blocks 30, secured to the plate 14 and having undercut ends which engage a stop rib 31, on the feed member 28. The said member 28 has on its upper surface complementary lugs and recesses 32 to engage the lugs and recesses 22 on the carrier 18, so that upon lowering the carrier to the position shown in Fig. 3, the lugs and recesses will engage as illustrated in Fig. 6. When the parts are thus engaged it is obvious that rotation of the carrier 18, will cause rotation of the feed member 28 and it will be moved upwardly by reason of its threaded engagement with the projection 29, thus gradually elevating carrier 18 and expander 19, causing the foot 20 to have both a rotating and longitudinal travel, which will result in the inclined face of the foot gradually spreading or expanding the nipple end as shown in Fig. 4. It is understood, of course, that the screw 26, will be gradually slacked off as the tool moves upwardly or longitudinally.

When the tool is fed upwardly to give a sufficient expansion to the lower end of the nipple, feed member 28 will engage the annular shoulder 30' on the plate 30 by its annular rib 31 and longitudinal movement of the tool and further spreading or expanding of the nipple will cease.

The feed screw 26, may then be slacked off, the expander 19 and its foot 20 released and brought to a position within the circumference of the carrier 18, the carrier and tool withdrawn to the position shown in Fig. 1, the key of the corporation cock turned to shut-off position, and the device removed.

In order that the expanding foot 20, may, when the machine is not in use, be properly protected, we provide a closure cap 33, (see Fig. 7,) which is threaded into the recess in the plate 14 which receives the upper end of the corporation cock, thus protecting the tool from injury and doing away with the necessity of withdrawing the tool entirely within the recess. In addition to protecting the lower end of the tool, this closure keeps the cock socket in the plate 14 always in good condition and free from dirt or other foreign matter which might collect therein.

While we have shown a particular embodiment of our invention it will be understood that mechanical variations may be made, without departing from the spirit of our invention, and we do not confine ourselves, therefore, to the details of construction shown and described.

We claim:

1. In a device of the class described, the combination of a supporting frame, an expanding tool mounted in said frame, means for rotating said tool, and independent, positively actuated rotatable means to effect automatically longitudinal movement of said tool when said tool is rotated.

2. In a device of the class described, the combination of a supporting frame, a rotatable expanding tool mounted in said frame, and independent, positively actuated means carried by said frame to effect automatically longitudinal movement of said tool when said tool is rotated.

3. In a device of the class described, the combination of a supporting frame, a rotatable expanding tool mounted in said frame, independent, positively actuated means to effect automatically longitudinal movement of said tool when rotated, and means to cause simultaneous rotation of said tool and first mentioned means.

4. In a device of the class described, the combination of a supporting frame, a rotatable expanding tool mounted in said frame, independent, positively actuated feeding means carried by said frame to effect automatically longitudinal movement of said tool when rotated, and a connection between said tool and feeding means to cause rotation of said feeding means when the tool is rotated.

5. In a device of the class described, the combination of a supporting frame, a rotatable expanding tool mounted in said frame, an independent traversing feeding member mounted on said frame and movable longitudinally with respect thereto, and means on said member engaging said tool to automatically effect longitudinal movement thereof when said tool and member are rotated.

6. In a device of the class described, the combination of a supporting frame, a rotatable expanding tool mounted in said frame, a traversing feeding member threaded to said frame and adapted upon rotation to effect automatically longitudinal movement of said tool, and inter-engaging means between said tool and member to effect rotation of said member when said tool is rotated.

7. In a device of the class described, the combination of a supporting frame, a rotatable expanding tool mounted in said frame, a tool feeding member threaded to said frame, means to limit the traverse of said member, and inter-engaging means on said tool and member to effect rotation of said member and longitudinal movement of said tool when said tool is rotated.

8. In a device of the class described, the combination of a supporting frame, a rotatable expanding tool mounted in said frame, a threaded projection on said frame, a tool feeding member engaging said threaded projection and surrounding said tool, said member being provided with an interlocking lug, and an interlocking lug on said tool to engage said member to effect rotation thereof when said tool is rotated and cause longitudinal movement of said tool.

9. In a device of the class described, the combination of a supporting frame, having a plate adapted to be secured in fixed relation to a fitting, a rotatable expanding tool mounted in said frame for longitudinal movement, a threaded projection on said frame, a cup-shaped feeding member having threaded engagement with said projection and having a locking lug, means carried by said frame to limit the traverse of said feeding member, a locking lug on said tool to engage said first named lug and rotate said member to effect longitudinal movement of said member and tool upon rotation of said tool.

10. In a device of the class described, the combination of a supporting frame having a plate adapted to be secured in fixed relation to a fitting, a rotatable expanding tool traversing said plate, a threaded projection on said plate, a rotatable cup-shaped feeding member having stop engaging means threaded on said projection, stops on said plate to limit the traverse of said feeding member, a locking lug projecting from said feeding member, and a locking lug on said tool to engage said first named lug to effect rotation of said feeding member and longitudinal movement of said member and tool upon rotation of said tool.

11. In a device of the class described, the combination of a supporting frame having a plate adapted to be secured in fixed relation to a fitting, a stuffing box carried by said plate, a carrier tube passing through said stuffing box, a stuffing box in said carrier tube, and an expanding tool passing through said carrier tube and stuffing box.

12. In a device of the class described, the combination of a frame, an expanding tool rotatably mounted therein, feeding means for automatically moving said tool longitudinally when rotated, and a feeding-screw controlling the longitudinal movement of said tool.

13. In a device of the class described, the combination of a frame, a tool mounted in said frame, means for rotating said tool, feeding means operative upon rotation of said tool automatically to move said tool longitudinally in one direction, and a second feeding means to move said tool longitudinally in an opposite direction.

14. In a device of the class described, the combination of a frame, a tool mounted in said frame, means for rotating said tool, feeding means operative upon rotation of said tool automatically to move said tool longitudinally in one direction, and a second feeding means to move said tool longitudinally in the opposite direction, and to resist its movement in the first mentioned direction.

15. In a device of the class described, the combination of a frame, a tool mounted in said frame, means for rotating said tool, feeding means operative upon rotation of said tool automatically to move said tool longitudinally in one direction, and a second manually feeding means to move said tool longitudinally in the opposite direction, and to resist its movement in the first mentioned direction.

16. In a device of the class described, the combination of a frame adapted to be secured to a corporation cock, of a rotatable expanding tool formed of two eccentrically disposed members carried by said frame, means for forcing said tool through said cock and its supporting nipple, and means for withdrawing said tool when rotated to effect the expanding operation.

17. In a device of the class described, the combination of a frame adapted to be secured to a corporation cock, of a rotatable expanding tool formed of two eccentrically disposed members carried by said frame, means for forcing said tool through said cock and its supporting nipple, and means for automatically withdrawing said tool when rotated to effect the expanding operation.

18. In a device of the class described, the combination of a frame adapted to be secured to a corporation cock, of a rotatable expanding tool formed of two eccentrically disposed members carried by said frame, means for forcing said tool through said cock and its supporting nipple, means to prevent the escape of fluid when said tool is forced through said cock, and means for automatically withdrawing said tool when rotated to effect the expanding operation.

In testimony whereof we have hereunto set our hands.

PHILIP MUELLER.
ANTON C. SCHUERMANN.